April 15, 1969     C. L. WHITEFORD     3,439,078

PROCESS FOR STAMPING THERMOPLASTIC ELEMENTS

Filed Feb. 16, 1967

INVENTOR.
CARLTON L. WHITEFORD
BY
*Peter L. Costas*
ATTORNEY

United States Patent Office 3,439,078
Patented Apr. 15, 1969

3,439,078
PROCESS FOR STAMPING THERMOPLASTIC ELEMENTS
Carlton L. Whiteford, Stamford, Conn., assignor to Poly-Pak Corporation of America, Springdale, Conn., a corporation of Delaware
Filed Feb. 16, 1967, Ser. No. 616,563
Int. Cl. B29f 5/00; B29c 3/00
U.S. Cl. 264—88                          11 Claims

ABSTRACT OF THE DISCLOSURE

A high-speed thermoforming process is provided wherein preheated thermoplastic sheet material is clamped and rapidly forced by a male mold member into a liquid medium which simultaneously forms the sheet material about the mold member and rapidly chills the formed part. In this manner, partial orientation of the molecules may be achieved in a high-speed process of forming from sheet material of little or no orientation.

Background of the invention

The present invention relates to thermoforming of thermoplastic sheet materials and, more particularly, to a high-speed thermoforming process wherein the sheet material is deformed by a mechanical element.

In conventional thermoforming processes, the heated sheet material is displaced into conformity with a mold surface by air pressure (either negative or positive) oftentimes in conjunction with mechanical plug assistance, and it is chilled while retained in contact with the mold surface so as to set in the deformed condition. Generally, these processes require relatively long time cycles (>3 seconds) for forming the part and then cooling it sufficiently to remove it from the mold. In addition, some processes require cycling of the temperature of the mold component. As a result, thermoforming processes have been limited in their application for high-speed packaging lines. In addition, the general requirement to heat the thermoplastic sheet material above its molten temperature for facile thermoforming has detracted from maximum strength for unit thickness by substantially eliminating molecular orientation.

Accordingly, it is an object of the present invention to present a process for thermoforming sheeting of thermoplastic material at high speed and on a continuous basis, if so desired.

Another object is to provide a simple thermoforming process using positive mechanical action for rapid, relatively trouble-free operation which does not require temperature cycling.

An additional object is to present a process wherein sheet material of orientable thermoplastic can be molded and simultaneously multiaxially oriented.

Still another object is to provide relatively inexpensive and efficient apparatus for high-speed thermoforming of sheets of thermoplastic material.

Summary of the invention

It has now been found that the foregoing and related objects may be readily attained in a process wherein sheeting of thermoplastic material is preheated to a first temperature above ambient temperature sufficient to permit forming thereof without fracturing the sheeting. A shaped male molding member of the desired configuration is then moved against one surface of the sheeting to press it into a body of liquid medium maintained at a second temperature below the first temperature sufficiently to set the thermoplastic material rapidly after contact therewith. The flow of liquid material from the resisting body thereof is restricted so as to produce pressure upon displacement by the molding member and sheeting acting against the other surface of the sheeting to form it against the molding member while setting the thermoplastic material to produce a hollow article in the configuration thus established.

The temperatures utilized for the process will vary depending upon the particular thermoplastic material which is being formed as well as the heat capabilities of the apparatus. Although the thermoplastic material can be heated to above its molten temperature, the present process enables the forming of the sheeting at temperatures considerably below the molten temperature and at relatively high speed by reason of the substantial pressures and techniques utilized. Generally, the temperatures are at least 50 degrees below the molten temperature of the thermoplastic and oftentimes 100 degrees or more below such temperature.

When using a crystalline thermoplastic, orientation of the molecules may be obtained in this process by reason of temperatures which fall within the orientation range and the pressures involved. Where the sheeting is subjected to some preorientation, the temperature employed for preheating the sheeting should be below the orientation temperature to avoid disorientation of the molecules and undue stress upon the clamping mechanism, and the degree of orientation should be sufficiently low so that the further orientation produced by the forming operation will not excessively stress the material.

Prior to the forming step, the preheated sheeting is clamped about the periphery of the area to be formed by the molding member, and most desirably the clamping means is chilled to set the thermoplastic rapidly and to minimize any tendency for deformation thereof.

The molding member is also chilled so that it rapidly chills the thermoplastic material adjacent the surface in contact therewith, thereby cooperating in the setting of the thermoplastic material in the desired configuration of the hollow article.

The temperature of the liquid medium may, of course, vary considerably depending upon the thermoplastic material employed and the temperature gradient required to rapidly set the thermoplastic material. The preferred temperatures for the liquid medium will normally be below ambient temperature to effect rapid setting of the thermoplastic material. By maintaining as great as possible a differential between the temperature to which the thermoplastic material is heated and the temperature of the liquid medium, the thermoplastic material will be most rapidly set, but considerations of economics and the need for avoiding premature setting enter into the choice of the specific temperature selected. However, temperatures on the order of 20 to 50° Fahrenheit may generally be employed for the liquid medium with a high degree of efficacy.

The particular liquid medium utilized should be inert to the thermoplastic material and should not contaminate the hollow article as formed. Desirably, it is relatively inexpensive and has relatively low vapor pressure at the temperatures involved. Although various liquids such as ethylene glycol and other organics may be utilized, aqueous media have proved particularly advantageous because of the economics involved. Thixotropic agents may be added to the liquid medium to increase the viscosity thereof and reduce any tendency for splashing and loss. In addition, the aqueous media may contain chemical agents which will lower the freezing point thereof, such as ethylene glycol. By use of aqueous media, the tendency for moisture from the atmosphere to condense upon the apparatus and liquid medium due to their low temperature may be accommodated since the condensed moisture will merely add to the liquid medium.

The thermoplastic sheeting should be spaced above the liquid medium in its initial position to avoid premature chilling thereof, but excessive distance should be avoided to prevent undue delay in chilling and setting of the thermoplastic material during the forming cycle. Obviously, the volume of liquid medium within the receptacle should be proportioned to the size of the receptacle itself and the molding member to ensure that the liquid medium will contact substantially the entire surface of the deformed thermoplastic sheeting to effect setting thereof.

The apparatus used for the foregoing technique is relatively simple and rugged in construction. Its essential components include an open-mouthed receptacle in which is provided the body of liquid medium and means for restricting the flow of the liquid medium from the body to generate the desired pressure acting against the sheeting and mold member. Although this may be effected by sealing the receptacle during the forming operation and controlling the volume closely, a more effective technique which also compensates easily for loss of liquid medium utilizes an auxiliary vessel providing a reservoir for the liquid medium in the receptacle and communicating therewith through a conduit. This vessel is sealed with a suitable pressure relief valve so that pressure may be generated therein and rapidly relieved and fluid from the reservoir will flow into the vessel to maintain the desired level.

The forming mechanism is positioned adjacent the open mouth of the receptacle and includes a clamping element cooperating with the receptacle about its open mouth to clamp the sheeting firmly about the periphery of the area to be thermoformed and maintain it under tension during the forming operation. In order to minimize any tendency for the clamped sheeting to deform during the stamping operation, the clamping element preferably is chilled so as to set the thermoplastic material to a point where deformation is substantially prevented.

The forming mechanism includes a molding member with an external configuration conforming substantially to the desired internal configuration for the hollow article to be produced by the apparatus and most desirably includes means for chilling the molding member to a temperature sufficiently low to set the thermoplastic material adjacent the surface in contact therewith. Suitable means are provided for mounting the molding member for reciprocation relative to the body of liquid medium in the receptacle and power means are connected thereto so as to reciprocate the molding member and press sheeting clamped about the periphery of the receptacle into the body of liquid medium.

Desirably, the apparatus also includes means for preheating the sheeting to the desired forming temperature and additional means for chilling the liquid medium to the desired temperature for setting the thermoplastic material. Since the preheating is desirably effected at a point prior to clamping, the apparatus is desirably multistage and includes a preheating stage for the sheeting, means for indexing the sheeting from the preheating stage to the receptacle or forming stage and means for indexing the sheeting and hollow article from the forming stage to a trimming stage. It can be seen that the web provided by the sheeting about the thermoformed area acts as the carrier for transport of the thermoformed hollow article from the forming stage to the trimming stage.

The several steps are operated in time sequence so as to function simultaneously on successive portions of an elongated length of sheeting such as being dispensed from a roll. By proper selection of the parameters for the process conditions, the cycle time in each stage can be held to periods of about one-third to one second. As a result it is possible to operate the apparatus at a high rate of speed with obvious benefits in economy as well as adaptability to high speed packaging installations.

Various thermoplastic materials may be employed for forming in the present invention with the preferred materials being those which are substantially crystalline and therefore orientable to obtain greater strength. Indicative of the various thermoplastic materials are polyvinyl chloride, polyvinyl copolymers, polyolefins, polycarbonates, styrene/acrylonitrile copolymers and rubber graft copolymers.

Figure 1:
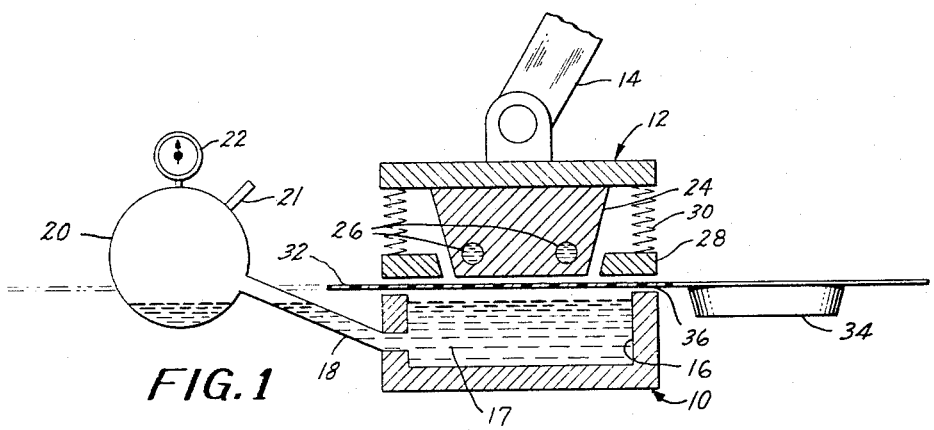
FIGURE 1 is a diagrammatic view of apparatus embodying the present invention, showing the molding assembly at the initial stage in the cycle.
Figure 2:
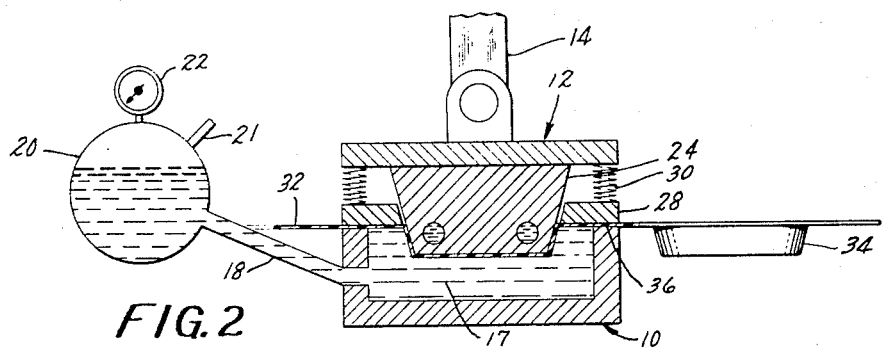
FIGURE 2 is a similar view thereof with the molding assembly at the bottom of the forming stroke.
Figure 3:
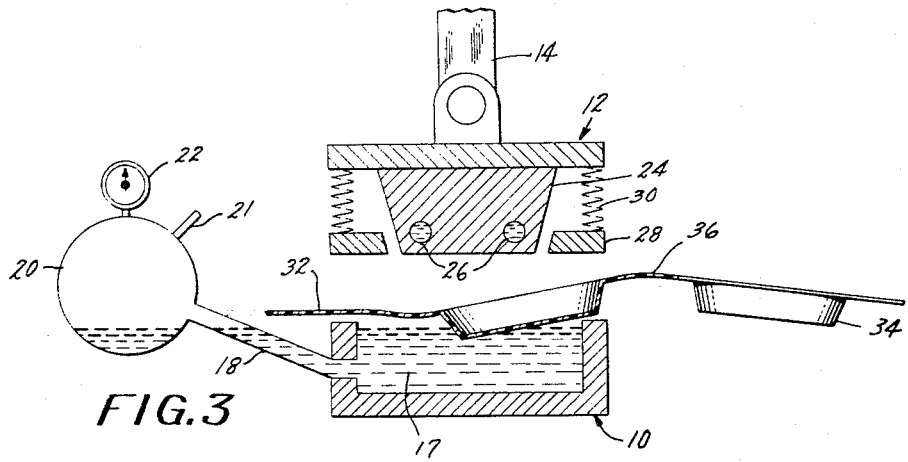
FIGURE 3 is a similar view with the molding assembly at the end of the cycle and with the formed article being indexed to the next stage.

Referring now in detail to the attached drawing, FIGURES 1-3 diagrammatically illustrate a thermoforming process and apparatus embodying the present invention which includes a lower mold element generally designated by the numeral 10 and an upper mold element generally designated by the numeral 12 which is reciprocated with respect to the lower mold element 10 by the crank 14.

As can be seen, the lower mold element 10 is a receptacle providing a chamber 16 in which is disposed a body of liquid medium 17 which communicates with a vessel 20 providing a reservoir for receiving liquid medium 17 through the conduit 18. The vessel 20 has a pressure-relief valve 21 which is responsive to operation of the apparatus by suitable electrical or mechanical activation, as will be hereinafter described, and a pressure gauge 22.

The upper mold element 12 includes a molding member of plug 24 having for its external configuration the desired internal configuration for the hollow article to be produced. The molding member 24 is cooled by suitable coolant circulating through coils or conduits 26 therein. The clamping element 28 has an aperture in the center porton thereof through which the molding member 24 extends and is biased towards the lower mold member 10 by the springs 30, preferably into a position outwardly from the molding member 24.

In operation of the apparatus, sheeting 32 of thermoplastic material, preferably from a roll thereof, extends between the lower and upper mold members 10, 12. At the commencement of the operating cycle, the crank 14 starts to move the upper mold member 12 towards the lower mold member 10, and the clamping member 28 firmly clamps the sheeting 32 between it and the lower mold member 10 about the open mouth of the chamber 16. Although the springs 30 permit the relative movement of the clamping member, they nevertheless provide sufficient pressure to ensure the continued firm clamping engagement required to prevent slippage of the sheeting 32. The clamping member 28 desirably is cooled by suitable means, such as coolant conduits (not shown), so as to rapidly set the thermoplastic material in the area of clamping engagement and thus minimize any tendency for this portion to be distended during the subsequent forming operation.

As the crank 14 continues to lower the upper mold member 12, the molding member or plug 24 contacts the sheeting 32 and presses it downwardly into the chamber 16 and into the liquid medium 17. As the molding member descends into the liquid medium 17, it displaces the medium so that the entire chamber 16 is filled therewith and so that some escapes from the chamber 16 through the conduit 18 into the vessel 20. Since the vessel 20 is closed to the atmosphere during this portion of the cycle, pressure is developed upon the liquid medium therein and thereby the liquid medium 17 in the chamber 16, so that it resists displacement and exerts sufficient pressure upon the sheeting 32 to form it about the molding member 24 and into conformity with the external configuration thereof. Since the liquid medium 17 is chilled as is the molding member 24, the thermoplastic material of the sheeting 32 is rapidly set during the rapid formation thereof. As a result, a hollow article 34 having the desired configuration is produced in the sheeting 32 with adjacent hollow articles 34 being connected by web portions 36.

As soon as the forming cycle has produced the hollow article and set the thermoplastic material, the pressure-relief valve 21 is actuated to vent the air under pressure to the atmosphere and relieve the pressure upon the liquid medium 17. The crank then lifts the upper mold member 12 away from the lower mold member 10 so that the restraining pressure of the molding element 24 and clamping elements 28 are removed from the sheeting 32. Simultaneously, liquid medium from the vessel 20 flows back into the lower mold member 10 through the conduit 18, and the buoyant effect upon the sheeting lifts the sheeting and the hollow article 34 upwardly so that the sheeting 32 may be indexed to present a new portion for clamping and forming. As the liquid medium is flowing from the vessel 20 into the lower mold member 10, air again enters the vessel 20 and the valve 21 is again closed.

The sheeting 32 with its formed hollow articles 34 is desirably advanced to another stage in the apparatus wherein the sheeting is trimmed about the web portions 36 so as to present finished articles of the desired configuration. Similarly, the apparatus desirably includes a preheating stage wherein the sheet material 32 may be preheated to the desired temperature by suitable heating means such as infrared heating elements, and the spacing between the preheating stage and the cooperating mold members 10, 12 is preferably minimized and shielded so as to reduce any tendency for the heat imparted to the sheeting 32 to be lost to the atmosphere. In its preferred form, the lower mold member 10 desirably includes a peripheral diffusion element (not shown) of porous metal at the upper edge thereof about the chamber 16 cooperating with the clamping element 28 so that the air above the liquid medium 17 may diffuse outwardly therethrough. Also not shown is suitable mechanism for cooling the liquid medium 17 and the coolant for the molding element 24 and clamping element 28, as well as the mechanism for indexing the sheeting 32 from one stage to another and the control apparatus for operating the crank 14, relief valve 21 and the mechanism in the preheating and trimming stages in timed sequence.

Exemplary of the conditions which may be utilized in the present process are a suitable cam drive mechanism for the crank 14 which will generate pressures in the order of 25 to 150 tons. The drive mechanism is such as to produce the full downward movement of the upper mold element 12 in a period of one-eighth to one second. Such apparatus may be conveniently adapted from metal stamping equipment.

The conduit 18 preferably is connected to the chamber 16 through a plurality of small apertures, and the vessel 20 and the volume of the liquid medium are cooperatively proportioned so as to generate predetermined pressures acting upon the liquid medium on the order of 100 to 2000 pounds per square inch, and preferably about 300 to 1000 pounds per square inch. The liquid medium 17 is desirably aqueous and is maintained at a temperature on the order of 30 to 50° Fahrenheit, and preferably 30 to 40° Fahrenheit, the exact conditions varying with the temperature of the sheeting and the temperature required to effect the setting within a predetermined period. The control means should desirably provide a residence time for the molding element 24 in its lowermost position of about one-eighth to one-half second to ensure proper setting of the thermoplastic material and relief of the pressure upon the liquid medium through the valve 21. By proper selection of the several variables for a given thermoplastic material, total cycle times on the order of one-half to one second are feasible.

Accordingly, it can be seen that the present invention provides a process for thermoforming sheeting of thermoplastic material at high speed and conveniently from a continuous roll. The process is adapted to relatively rugged and relatively inexpensive apparatus utilizing positive mechanical action for rapid, relatively trouble-free operation and avoids the necessity for temperature cycling of the mold components. Moreover, by the process of the present invention, substantially crystalline thermoplastic materials can be simultaneously molded and multiaxially oriented to a desirable degree.

Having thus described the invention, I claim:

1. In a process for high speed thermoforming sheeting of thermoplastic material into a hollow article of desired configuration, the steps comprising; preheating sheeting of thermoplastic material to a first temperature above ambient temperature; moving a shaped molding member against one surface of said preheated sheeting to press it into a body of liquid medium within a receptacle, said liquid medium being maintained at a second temperature below said first temperature sufficiently to set said thermoplastic material rapidly after contact therewith; and restricting the flow of said liquid medium from said body thereof to produce pressure upon displacement thereof by the molding member and sheeting acting against the other surface of said sheeting to form said sheeting against said molding member while setting said thermoplastic material to produce a hollow article in the configuration thus established having its molecules substantially oriented.

2. The process in accordance with claim 1 wherein said liquid medium is aqueous.

3. A process in accordance with claim 1 wherein said liquid medium contains a thixotropic agent.

4. The process in accordance with claim 1 wherein said shaped molding member is cooled to a temperature below said first temperature to set said thermoplastic material adjacent said one surface.

5. The process in accordance with claim 1 wherein said thermoplastic material is substantially crystalline with said first temperature being below the molten temperature of said thermoplastic and the thermoplastic material of the hollow article being produced having its molecules substantially multiaxially oriented.

6. The process in accordance with claim 1 wherein said sheeting of thermoplastic material has a relatively low degree of molecular orientation and the first temperature is below the initial orientation temperature of the molecules of the thermoplastic material in the hollow article.

7. The process of claim 1 wherein said preheated sheeting is clamped by suitable clamping means prior to formation by said molding member with the molding member moving against the area of the sheeting within the clamped portion.

8. The process of claim 7 wherein said clamping means is at a temperature below said first temperature sufficiently to set said thermoplastic material after contact therewith.

9. The process in accordance with claim 1 wherein said sheeting is elongated with said molding member operating against only a portion of the length and wherein said sheeting is indexed after the molding of the hollow article to present another portion of the sheeting for forming.

10. In a process for high speed thermoforming sheeting of thermoplastic material into a hollow article of desired configuration, the steps comprising; preheating sheeting of thermoplastic material to a first temperature above ambient temperature but below the molten temperature of said thermoplastic material; clamping said sheeting about the area to be formed by suitable clamping means maintained at a temperature below said first temperature sufficiently to set said thermoplastic material rapidly after contact therewith; moving a shaped molding member against one surface of said preheated sheeting to press it into a body of liquid medium within a receptacle, said liquid medium and molding member being maintained at temperatures below said first temperature sufficiently to said thermoplastic material rapidly after contact therewith; and restricting the flow of said liquid medium from said body thereof to produce pressure upon displacement thereof by the molding member and sheeting acting against the other surface of said sheeting to form said sheeting against said molding member while setting said thermoplastic material to produce a hollow article in the configuration thus established having its molecules substantially oriented.

11. The process in accordance with claim 10 wherein said thermoplastic material is substantially crystalline and wherein the thermoplastic material of the hollow article produced thereby has its molecules substantially multi-axially oriented.

References Cited
UNITED STATES PATENTS

| | | | |
|---|---|---|---|
| 2,365,637 | 12/1944 | Helwig | 264—92 |
| 2,410,857 | 11/1946 | Ahern | 18—19 |
| 2,760,233 | 8/1956 | Bjorkston | 264—88 |
| 2,924,852 | 2/1960 | Micnalko | 18—56 |
| 3,220,102 | 11/1965 | Lieberman | 18—19 |
| 3,258,813 | 7/1966 | Grotn | 18—19 |

ROBERT F. WHITE, *Primary Examiner.*

R. R. KUCIA, *Assistant Examiner.*

U.S. Cl. X.R.

18—19; 264—237, 296, 322